ONE CORE PER BIT SHIFT REGISTER

Filed June 8, 1955

INVENTORS
JOHN PAUL JONES
ALBERT J. MEYERHOFF

BY

George Baron

ATTORNEY 2,911,626
Patented Nov. 3, 1959

2,911,626

ONE CORE PER BIT SHIFT REGISTER

John Paul Jones, Pottstown, and Albert J. Meyerhoff, Wynnewood, Pa., assignors to Burroughs Corporation, Detroit, Mich., a corporation of Michigan Application June 8, 1955, Serial No. 513,976

9 Claims. (Cl. 340—174)

This invention relates to magnetic shift registers, and more particularly, though not necessarily exclusively, to a one core per bit shift register.

Magnetic cores having a rectangular hysteresis loop characteristic play a prominent part as components in high-speed computing devices because of their relative simplicity of operation, construction, reliability and low cost. Because of this hysteresis characteristic binary information can be stored in a magnetic element or core by the flux direction of the magnetism remaining in the core after the core has been cut by a magnetic field of a predetermined minimum strength. The stored information in the core can be transferred or shifted to another magnetic core. In early teachings of computers employing binary cores, a signal was required to actuate a core, and thus store information in said core. At some time later it was necessary to send another signal of the proper polarity to the same core in order to transfer or read out said stored signal. In such a system of storage and transfer of information, two magnetic cores are required for each binary digit or bit of information and two sequential actuating pulses, each applied to a different core, are required to shift each bit of binary information along a shift register.

The above noted method of switching and transferring information is referred to in the magnetic art as a "two core per bit" system because separate cores are needed to read in and read out a single bit of information at different times.

The present invention affords a single core per bit shift register system instead of a two core per bit shift register. A single core per bit system generally requires an initiation, by an advancing pulse, of the clearance of information stored in a core and the reading out or interrogation of such stored information in a preceding core into the cleared core without the need of an additional advancing pulse. In obtaining the advantage of a single core per bit in a shift register, a delay must be inserted in the shift register circuit. The advancing pulse will switch the cores of an array so that when all the cores are being cleared simultaneously it is necessary to delay the transfer of information from one core to the next core until the next core has completely switched.

In prior art devices, when a binary core of a one core per bit shift register was switched, one relied upon a storage device, such as a capacitor, to store the information signal that was read out of a transferor core by an interrogation pulse so that the read-out signal would not affect an adjacent core while the latter was being interrogated by the same interrogation pulse. As soon as the interrogation pulse was terminated, the energy stored in the capacitor was utilized to switch the interrogated adjacent core. Thus the two steps applied to a core, namely, clearing and reading-in, were accomplished with a single interrogation pulse.

Delay circuits employed in a one core per bit shift register have been found unsatisfactory because the delay circuits must store enough energy to drive the transferee core. Generally a power diode is necessary to maintain current flow in a given direction so as to shift the transferee core into the proper stage. Moreover, the delay circuit, by being coupled to the winding of the transferee core, will transmit its energy into a low impedance magnetic core winding, and the delay circuit must be discharged immediately to retain enough energy to switch a core.

The present invention provides a one core per bit shift register wherein the particular characteristics of a transistor are employed in a novel manner hereinafter described in combination with a magnetic shift register. Transistor action depends heavily on the fact that significant currents flow in semiconductors even in the absence of an electric field. If a bunch of holes is injected at one point into a block of n-type semiconductor crystal such as, though not necessarily, germanium, holes will tend to spread out throughout the crystal, and then ultimately recombine with the excess electrons in the n-type crystal. This spreading out of holes constitutes an electric current, such current being referred to as a diffusion current.

However the spreading out of holes from the emitter of a transistor to the collector of the transistor takes a finite time. This phenomenon, referred to as "hole storage delay," is utilized in a novel manner in a magnetic shift register so as to attain the advantage of a one core per bit shift register. The hole storage delay phenomenon not only serves as the capacitor it replaces in prior art one core per bit shift registers to delay the information signal read out of a transferor core while the transferee core is being interrogated, but also acts as an amplifier, supplying a regenerative read-in voltage which is independent of the input trigger amplitude or pulse width that triggers the transistor core driver.

It is a general object of this invention to provide an improved magnetic shift register.

A further object is to provide an improved one core per bit shift register.

It is a further object to utilize a transistor in the transfer loop coupling cores in a shift register so as to attain a speedy but reliable and efficient one core per bit shift register.

These and other objects will become evident from a description of the accompanying drawings in which.

Figures 1, 2, 3, 4:
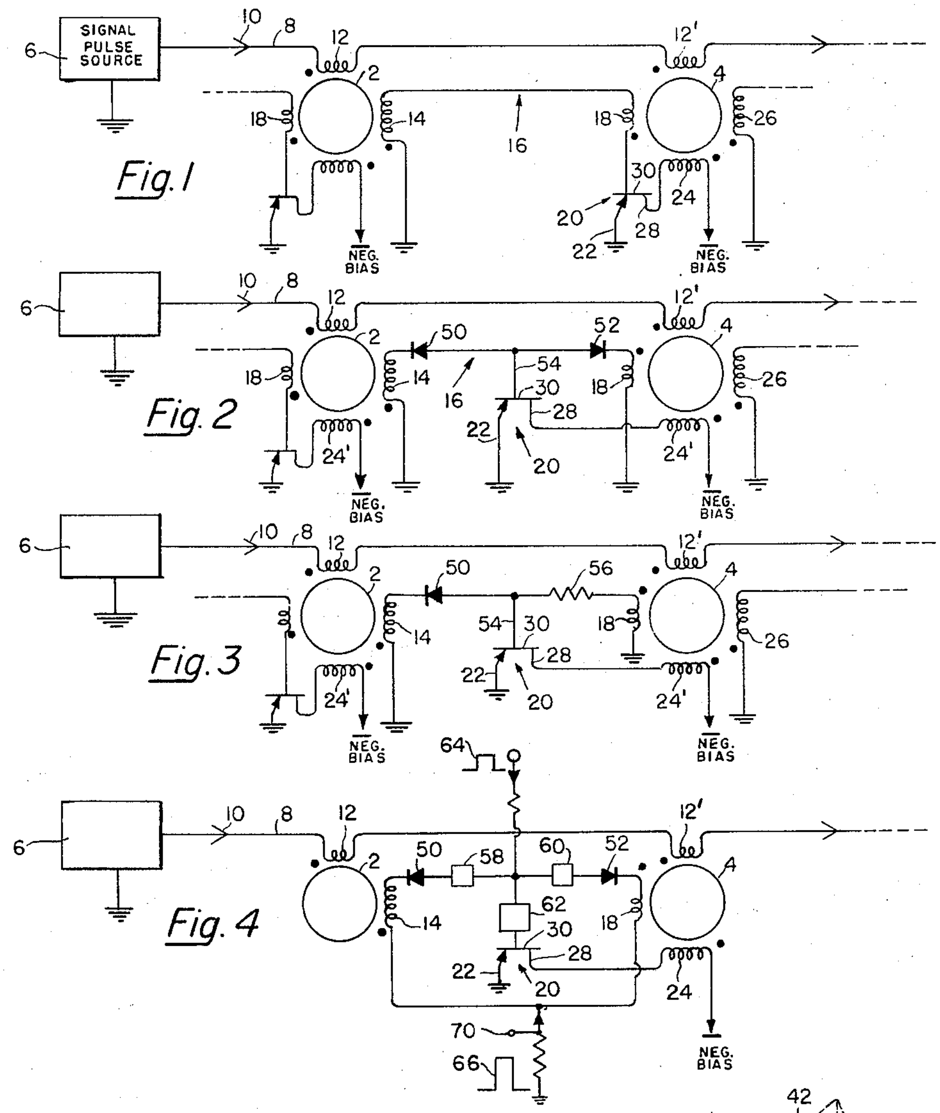
Figure 1 is a schematic representation of the transistorized transfer loop of a one core per bit shift register that may be employed in carrying out the invention.
Figure 2 is a modification of the invention wherein diodes or similar asymmetrically conducting devices are employed in conjunction with the transistor for increasing the storage capacity of the embodiment of Figure 1.
Figures 3 and 4 are further modifications of the embodiment set forth in Figure 2.

Figure 1 shows two bistable elements such as, though not necessarily, magnetic cores 2 and 4 which are two in an array of similar cores employed in a magnetic shift register, wherein such an array can consist of any desired number of cores. The conventional notation as used in the description of the instant invention requires that current enter the dotted terminal of an input winding associated with a core in order to tend to switch such core to its "0" state. A current pulse entering the undotted terminal of such input winding will tend to read a "1"

into the core associated with such winding. The bistable elements such as cores 2 and 4 which store information have substantially rectangular hysteresis loop characteristics and the positive remanent state of such a core is arbitrarily considered the "1" state of the core. The negative remanent state of the bistable core is considered its "0" storage state. Consequently as signal pulses from pulse source 6 create a current pulse in conductor 8 in the direction of arrow 10, such current pulses will enter the dotted terminals of clearing windings 12 and 12′ and will shift the cores 2 and 4 to their "0" states. Pulses from pulse source 6 generally appear periodically and are referred to in the shift register art as "clock pulses." Such clock pulses clear all the cores in the array appearing in a "1" state to a "0" state, thus generating a voltage pulse in the output winding of each core so cleared, such as output winding 14 of transfer loop 16 when core 2 is in a "1" state.

Assume that core 2 is in a "1" state and core 4 in a "0" state. Upon the clearing of core 2 by the action of a signal pulse from source 6 through winding 12, core 2 will switch and induce a voltage in winding 14. The voltage induced in winding 14 is such as to cause current flow from winding 14, through ground, emitter 22, winding 18 and back to winding 14. If such induced current flow were to be immediately sensed by the transistor 20 whose collector 28 is negatively biased, current would flow from the emitter 22 to the collector 28 and through the winding 24 to switch the core to a "1." However the ampere turns in winding 12′ will oppose such tendency to read a "1" into core 4. Means must be provided for attaining the clearance of a first core to its "0" state before the transfer of a "1" from another core to the first core can be carried out, else the first core would be subjected to conflicting magnetic fields.

It can be readily seen that in a one core per bit shift register it is necessary to delay the above described transfer of information from the transferor core 2 to the transferee core 4 until core 4 has been cleared by the current pulse through winding 12′ from source 6 and such cleared information has appeared as a voltage pulse across the adjacent output winding 26. The transfer delay must be sufficient to allow for the complete clearing of core 4 before the "1" stored in core 2 can be transferred to core 4. Such delay is accomplished by using a transistor in the read-in circuit of the shift register.

The transistor is able to perform the necessary delay because of the phenomenon which will be called, for purposes of describing the invention, "hole storage delay." It is to be understood that the theoretical considerations that follow are solely for the purpose of explaining how the invention operates in carrying out its function and are not presented as being the correct description of the phenomenon of hole storage.

The transistor 20 is biased negatively, the collector 28 being negatively biased, about —3 volts, with respect to the emitter 22 of the transistor. When core 2 is switched as a consequence of an advancing pulse being sent through winding 12, a voltage is induced in winding 14 of the transfer loop 16, said voltage causing current to flow into the dotted terminal of input winding 18 by way of ground, emitter 22 and base 30 of transistor 20. The entry of such current into the base 30 initiates the emission of holes from the emitter 22. These holes from the emitter 22 will diffuse toward the collector 28, but there will be a delay in transit; such delay, called the "diffusion time," is sufficiently long so that the core 4 is cleared of its information by the presence of the same clearing pulse through winding 12′ that has cleared core 2. The holes that have been delayed in transit from the emitter 22 to the collector 28 are stored in the transistor 20. When enough holes have accumulated in the transistor 20, a discharge of current through the transistor takes place, said discharge manifesting itself as a current through the undotted terminal of winding 24. The core 4 has been completely switched to its "0" state by the action of the clearing pulse through winding 12′, so the delayed current through the undotted terminal of winding 24 will tend to switch core 4 to its "1" state. As soon as core 4 begins switching to its "1" state, a regenerative feedback voltage is induced in the winding 18 such that current is caused to flow out of the undotted terminal of winding 18 toward undotted terminal of winding 14. This self-sustaining voltage occurs as long as the core 4 is being switched to a "1" and does not necessitate a continued application of the diffusion current in the transistor flowing through winding 24 which has served to trigger the regenerative switching cycle. This regeneration effect causes core 4 to completely switch to its "1" state, and upon completion of the switching of core 4 voltage is no longer induced in winding 18 and the transistor current terminates, leaving the collector of the transistor negatively biased to cut-off by the —3 volts bias.

An exemplary though nowise limiting circuit for Figure 1 would consist of forty turns in winding 14, twenty turns in winding 18 and sixty turns in winding 24. Thus, during read-out of a core such as core 2 in the array of cores in the shift register the voltage $e_1$ induced in winding 14 would be greater than the voltage $e_2$ induced in winding 18. The regenerative effect during read-in assures the switching of a transferee core once sufficient triggering current has been initiated in winding 24, and the read-in cycle is thus independent of the input amplitude or pulse width which drives the transferor core.

Figure 5:
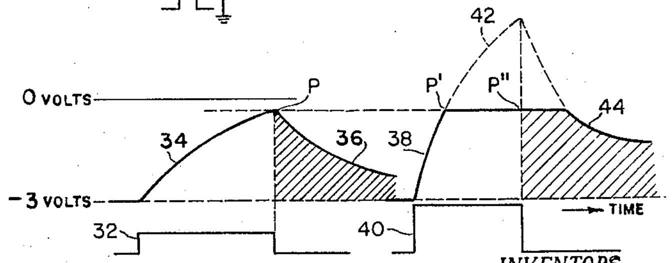
Figure 5 is a pulse-time diagram for aiding in the understanding of the delay circuit of a shift register.

A reference to Figures 5 and 6 will now be made as an aid in describing the delay mechanism and timing cycle of the transistorized shift register. In Figure 5 there is shown an advancing or shifting pulse 32 that is applied to windings 12, 12′, etc. in order to clear the cores in the shift register to their "0" states. The width of such pulse could be varied in the order of 0.75 to 1.5 microseconds. The presence of the advancing pulse 32 in windings 12, 12′ etc. commences the switching of all cores containing a "1" to their "0" states. Assuming core 2 to be in its "1" state, the clearing of core 2 will result in a voltage being induced in winding 14, as a consequence of such induced voltage current will flow from winding 14, through ground and to emitter 22 to initiate the emission of holes from the emitter 22. Due to the number of turns on winding 14 being substantially greater than the number of turns on winding 18, the voltage induced in winding 14 will override the opposing voltage which is induced in winding 18 if core 4 is also in the "1" state at the time pulse 32 is applied and switches to the "0" state in response thereto. Curve 34 represents the accumulation of holes in the transistor 20 during the life or width of the advancing pulse 32. The transistor, which creates the delay necessary in transferring information read out of core 2 to core 4 to assure that core 4 has been cleared, is selected to suit the speed of operation of the shift register. In one embodiment of the invention where one uses an advancing pulse width of the order of 0.75 to 1.5 microseconds, a low frequency transistor is utilized in the transfer loop so that the hole build-up in the transistor does not produce sufficient diffusion current to overcome the effect of driving current through winding 12′.

Point P of Figure 5 represents the approximate position along curve 34 with respect to input pulse 32 whereat the cores have been completely switched to their "0" states. At approximately this time P, the hole storage in the transistor is of sufficient density to cause current flow to the collector 28 so as to begin the regenerative switching action for reading into core 4 the "1" read out of core 2 described above. Should there be a tendency for current flow from emitter to collector of the transistor at some time along curve 34 prior to point P, the energy in the driving pulse 32 will override the effect of such transistor current. Curve 36 represents the time it takes to collect substantially all the holes being emitted from emitter 22 at the collector 28 and is the decay curve of the transistor current under non-regenerative conditions. It is during this exponential decay of hole current flow, subsequent to the switching of cores 2 and 4, that the information read out of core 2 is transmitted to core 4 since the polarity of the readout signal in winding 14 is such that it only builds up the holes in transistor 20 and does not of itself read a "1" into core 4. This decay time or "drag-out" time may take about four or five microseconds, thus limiting the shortest periodic pulse interval between clearing pulses to 5 or 6 microseconds. Subsequent circuitry will be described hereinafter to shorten such "drag-out" time.

Curve 38 of Figure 5 represents the hole build-up in the transistor when a driving signal pulse 40 having a greater amplitude than that of signal pulse 32 is applied from pulse source 6 to clear the cores. The build-up of holes to substantially zero potential near point P′ occurs faster when a higher amplitude signal pulse is used to drive the cores, but when the transistor 20 begins to conduct at this point because of attraction of the collector 28 for the holes emitted by the emitter 22, the transistor does not create more stored holes. The extrapolated portion 42 of the output waveform of the transistor 20 represents the hole build-up of the transistor that would occur were there a greater negative bias than —3 volts on the collector. With the —3 volt bias on the collector, and a higher amplitude driving pulse 40 than that of driving pulse 32, the pulse 40 has to overcome or override the effort of the transistor current during period $P^1$ to $P^{11}$ tending to drive a transferee core into regeneration while the latter is being cleared by a clearing pulse. As soon as the pulse 40 terminates, the transistor output decay follows the curve 44. In each case shown, the darkened areas under the curves 36 and 44 represent the flux energy available for triggering the transistor during the read-in cycle of the shift register.

Figure 6:
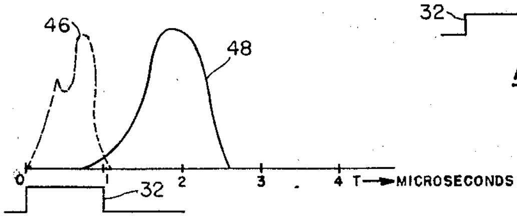
Figure 6 is a timing cycle diagram of the transistorized transfer loop from the time that the advancing pulse occurs to read out information from a core to the time that such information is read into another core.

In Figure 6 dotted curve 46 represents the voltage waveform that appears across the winding 14 of the transfer loop wherein the advancing pulse is shown as being 1 microsecond in width. Curve 48 depicts the voltage curve that appears at the collector 28 of the transistor 20 during the regenerative read-in cycle when the information is read out of the transferor core 2 into transferee core 4. Both voltage pulses 46 and 48 occur before a second advance pulse 32 is applied to the shift register. It will be noted in Figure 6 that the read-in circuit that includes the transistor 20 goes into complete regeneration, for the example shown, at about 1.5 microseconds.

The above described one core per bit shift register utilizes a transistor to serve the multiple purpose of a current driving amplifier, a replacement for the diodes normally employed in conventional transfer loops, and the delay means necessary for retaining information until the transferee cores are cleared. Moreover, the power dissipation is slight since the transistor circuit which supplies the read-in energy to the cores is biased to cut-off until the actual read-in cycle is required.

The circuit of Figure 1 may be employed as a cycle distributor or a counter. Without other provision, the circuit is somewhat limited in its use as a shift register should there be more than two "1's" stored in adjacent or successive cores of the register. If core 2 is in its "1" state and core 4 is also in a "1" state, upon the clearing of both cores, a voltage will be induced in winding 14 by the switching of core 2 such that current will flow into the undotted terminal of such winding 14 and another voltage will be induced in winding 18 because of the switching of core 4 such that current will be caused to flow into the undotted terminal of winding 18. Since such simultaneously induced voltages oppose each other, and winding 14 has more turns than winding 18, current will flow to support regenerative switching of core 4 as hereinbefore explained. The presence of another core in a "1" state, for example, a core (not shown) preceding core 2, will produce, when switched, regenerative switching of core 2. As a "1" is regeneratively read into core 2, a voltage is produced in winding 14 to prevent the above noted regenerative read-in of a "1" into core 4. Thus a grouping of cores containing more than two consecutive "1's" will not operate satisfactorily employing the circuit of Figure 1. The modifications of the invention as shown in Figures 2, 3 and 4 disclose various means for extending the circuit principles to operate as a shift register, regardless of the binary states of any of the cores, so as to overcome the limitation of the embodiment of Figure 1.

Figure 2 is substantially the same circuit as that shown in Figure 1 save that diodes 50 and 52 are placed in the transfer loop 16 on either side of the transistor 20, said diodes or similar asymmetrically conducting elements being oppositely polarized with respect to each other. Now assume that both cores 2 and 4 are each in the "1" state. When an advancing signal pulse from pulse source 6 clears the cores 2 and 4, a voltage is induced in winding 14 such that current will flow into the undotted terminal of said winding, through emitter 22, through lead 54 and back through diode 50. The switching of core 4 from a "1" to a "0" state will cause an induced current to flow into the undotted terminal of winding 18, but such current will not be able to flow through the transfer loop 16 because of the orientation of the diode 52. The transistor 20 is building up holes because of current flow from winding 14, through ground, through emitter 22, lead 54, diode 50 and back to winding 14. When cores 2 and 4 have been switched from their "1" states to their respective "0" states, the hole build-up is sufficiently large to permit current flow from emitter 22, base 30, collector 28, read-in winding 24′, and back to the emitter 22 through ground.

The flow of current through the undotted terminal of winding 24′ switches core 4 to its "1" state, thus transferring the "1" from core 2 to core 4. The switching of core 4 to its "1" state causes an induced current flow into the dotted terminal of winding 18 and such induced current flow completes its circuit by going from winding 18, through ground, through emitter 22, lead 54, diode 52, and back through winding 18. Such induced current flow is in the same direction as emitter to collector flow so that current through winding 24 is regenerated while core 4 is switching to its "1" state. This regeneration assures the complete switching of core 4. It is noted that during the read-in cycle of core 2, similar to the read-in cycle of core 4, flow of current through the undotted read-in terminal 24′ associated with core 2 will induce current flow to enter winding 14 through its dotted terminal, but such current flow cannot pass through diode 50. Thus Figure 2 permits hole-storage delay during read-out and regeneratively activated transistor current during read-in to attain a one core per bit shift register without conflict in the transfer loops coupling the transferor core and the transferree core.

In Figure 3, substantially similar results as those obtained in Figure 2 are obtained except that resistor 56 replaces diode 52 as a means for obtaining the necessary isolation of the cores from each other during the read-in and read-out cycles of the instant one core per bit shift register. Again, assuming that the cores 2 and 4 are both in their respective "1" states (no problem exists if they are both in their "0" states or one core is in one binary state and the adjacent core is in the opposite binary state), the reading-out of a "1" from core 2 will induce a current flow into the undotted terminal of winding 14. Such induced current will flow through winding 14, ground, through emitter 22 of transistor 20, through base 30, lead 54, diode 50, and back to winding 14. The reading-out of a "1" from core 4 will not only induce a current flow in winding 26 to maintain the shift of information from left to right along the shift register, but it will also induce current flow into the undotted terminal of winding 18.

Such induced current will enter the undotted terminal of winding 18; flow through said winding 18, through resistor 56 and lead 54 to apply current to base 30 of the transistor 20 so as to oppose the induced current flow through transistor 20 that was initiated by the switching of core 2. The resistor 56 is so chosen, however, that it diminishes considerably the current flow through it. As a consequence, during the reading-out cycle of cores 2 and 4, the induced current flow entering the transistor 20 through emitter 22 from winding 14 exceeds the induced current entering the transistor 20 from resistor 56 and lead 54. The current differential is sufficient to cause hole build-up in the transistor 20 during the read-out cycle of the cores.

The above-noted hole build-up from the emitter 22 takes place in the manner shown by curves 34 and 38 of Figure 5. The time delay in obtaining sufficient transistor current from emitter to collector is long enough to allow for the clearing of the cores by the driving pulses emanating from pulse source 6. During this delay the potential difference between emitter and collector diminishes as diffusion of holes from emitter to collector is taking place, but the transistor is substantially cut-off until P or P′ is reached. Diffusion current through the transistor 20 and read-in winding 24 takes place to initiate the regenerative read-in cycle. The termination of the input pulses, such as pulses 32 and 40, terminates the production of holes in the transistor. It is noted, from an observation of curves 36 and 44, that the output of the transistor does not drop off sharply. This failure to drop off sharply limits the high speed of operation of the shift register since it may take as much as 4 to 5 microseconds for the transistor to return to its −3 volt bias.

Figure 4 discloses a schematic diagram showing appropriate circuitry for eliminating the drag-out time of the transistor during the regenerative read-in cycle of the cores, where higher speed operation is essential. Figure 4 is similar to Figure 2 save that 58, 60 and 62 are included as optional impedances such as 10 ohm resistors that may be placed in the transfer loop circuit to smooth out slight variations in current flow through the transfer loop due to variations that may exist in the characteristics of the diodes. During the 0.75 to 1.5 microsecond time interval of the width of the driving pulse, such as pulse 32 or 40 of Figure 5, the cores in the shift register are read-out, and as was noted above in describing the operation of Figure 2, the diodes 50 and 52 isolate adjacent cores from each other during read-out. Upon the termination of the driving pulse 32 or 40, the regenerative read-in of the cores takes place. Once sufficient diffusion current has passed from emitter 22 to base 30, to collector 28 and then through read-in winding 24, the regenerative read-in cycle has begun, and further creation of holes from the emitter to the collector is no longer necessary to attain the read-in switching of the core being driven by the transistor output.

The read-in cycle may take approximately 1.5 to 2.5 microseconds to be completed. Curves 36 and 44 are not shown in such scale in the drawing that they reach the −3 volt line, but experiments have shown that such curves will reach the −3 volt line about four to five microseconds after the read-in cycle has been completed. It is believed that such delay in the transistor coming back to its −3 volt potential on the collector is due to the presence of holes in the transistor which continue to flow toward the collector after the core into which information has been read-in has switched. Applicant, by removing or cleaning out the holes in the transistor soon after the read-in cycle has been completed, reduces this delay so that the next read-out cycle can be commenced sooner.

The removal of holes from the transistor is accomplished by applying a positive pulse 64 to the base 30 through impedance 62 immediately after the regeneratively driven transistor output pulse has switched a core such as core 4. At the same time that a positive pulse is applied to the base 30 through impedance 62 another positive voltage pulse 66 may be applied as a back bias to prevent current flow through the diodes. The second positive voltage pulse 66 applied at point 70 has a greater amplitude than that of voltage pulse 64 to perform the process of hole clearance. The application of pulse 64 clears the holes through impedance 62, if present, so that curves 36 and 44 drop more sharply, resulting in a "drag-out" time of only one to two microseconds instead of four or five microseconds.

From the foregoing description it is seen that the present invention affords improved means for expediting the operation of a one core per bit shift register wherein the special properties of a transistor are exploited in an unusual and novel manner. Accordingly those novel features believed descriptive of the nature of the invention are defined with particularity in the appended claims.

What is claimed is:

1. In a one core per bit shift register wherein the cores of said register have substantially square hysteresis loop characteristics having a transferor core and a transferee core and first means for applying switching energy simultaneously to said cores, a transfer loop comprising an output winding coupled to the transferor core and an input winding coupled to the transferee core, two oppositely polarized unidirectional current flow members in series with said output and input windings, a transistor having an emitter, base, and collector and having its base connected to said transfer loop between said unidirectional current flow members, said transistor serving to effect transfer of an output signal, induced in the output winding by the switching of the transferor core, to the transferee core after said transferee core has been completely switched by said first means, a triggering winding coupled to said transferee core and connected to the collector electrode of said transistor, means for applying a negative bias to said collector electrode, and further means for simultaneously applying positive pulses of unequal amplitudes to the base and emitter, respectively, of said transistor.

2. A combination as defined in claim 1 wherein the means for applying a negative bias to the collector is a source of constant voltage.

3. A combination as defined in claim 1 wherein the negative bias means is a pulsed source.

4. In a one core per bit shift register wherein the cores of said register have substantially square hysteresis loop characteristics having a transferor core and a transferee core and first means for applying switching energy simultaneously to said cores, a transfer loop coupling said cores and comprising an output winding having two terminals and coupled with the transferor core and an input winding having two terminals and coupled with the transferee core, a first end terminal of the output winding connected to a first end terminal of the input winding, the second end terminals being joined to form a closed loop, said connection between said first end terminals including two oppositely polarized unidirectional current flow means to prevent current flow directly from one first end terminal to the other first end terminal, a transistor having an emitter, base and collector, said base being connected to the transfer loop between said unidirectional flow means, said transistor serving as a delay device, a triggering winding coupled to said transferee core and connected to the collector of said transistor, and means for applying a negative potential to the collector of said transistor, the switching of said transferor core causing current to flow through the base emitter junction of said transistor and through only one unidirectional flow means during the interval that said cores are being switched by said first means.

5. A one core per bit shift register comprising: a transferor core and a transferee core, each of said cores being capable of assuming either of two stable states of magnetic remanence one of which is a reference state, each of said cores having input, output and shift windings coupled thereto; pulse shift means for driving a current pulse through the shift windings of both of said cores simultaneously to switch substantially simultaneously both of said cores to their respective reference states, whereby a voltage is induced in each winding coupled to each of said cores in response to the switching of such core; a transistor having input-circuit electrodes and output-circuit electrodes; means including a first asymmetrically conducting device for applying across said input-circuit electrodes of said transistor substantially all of the voltage induced in the output winding of said transferor core when said transferor core switches to said reference state, thereby to forward bias said transistor into conduction; means connecting a first of said input windings of said transferee core in the output circuit of said transistor, whereby current flows through said first input winding when said transistor conducts; means including a second asymmetrical conducting device connecting a second of said input windings of said transferee core to the input circuit of said transistor and poled to prevent application to the input-circuit electrodes of said transistor of a substantial portion of the voltage induced in said second input winding when said transferee core switches to its reference state, thereby to maintain said transistor biased for conduction in response to the switching of said transferor core to its reference state despite the simultaneous switching of said transferee core to its reference state, said first and second input windings of said transferee core being wound in such sense relative to each other that the flow of transistor current in said first input winding tends to induce a voltage in said second input winding of a polarity to maintain said transistor biased for conduction, whereby said transistor conducts even during the substantially simultaneous switching of both said transferor and transferee cores to their reference states in response to a current pulse from said pulse shift means, and whereby, upon the substantially coincident termination of switching of said transferor and transferee cores and the consequent removal of the forward bias from the input-circuit electrodes of said transistor, transistor current continues nevertheless to flow for a short time through said transferee-core first input winding due to carrier storage in said transistor, said continued transistor current flow through said first input winding being sufficient to induce a voltage in said transferee-core second input winding of a polarity to bias said transistor for conduction, the action being regenerative and continuing until said transferee core has completely switched to its other state.

6. A one core per bit shift register comprising: a transferor core and a transferee core, each of said cores being capable of assuming either of two stable states of magnetic remanence, each of said cores having input and output windings coupled thereto; shift means for switching substantially simultaneously both of said cores, a voltage being induced in each winding coupled to each of said cores in response to the switching of such core; a transistor having input-circuit electrodes and output-circuit electrodes; means including a first asymmetrically conducting device for applying across said input-circuit electrodes of said transistor substantially all of the voltage induced in the output winding of said transferor core when said transferor core switches in response to said shift means, thereby to forward bias said transistor into conduction; means connecting one input winding of said transferee core in the output circuit of said transistor, whereby current flows through said one input winding when said transistor conducts; impedance means connecting another input winding of said transferee core to the input circuit of said transistor for applying to the input-circuit electrodes of said transistor of but a small portion of the voltage induced in said another input winding when said transferee core switches in response to said shift means, thereby to maintain said transistor biased for conduction in response to said shift switching of said transferor core despite the simultaneous shift switching of said transferee core, said one and another input windings of said transferee core being wound in such sense relative to each other that the flow of transistor current in said one input winding tends to induce a voltage in said another input winding of a polarity to maintain said transistor biased for conduction, whereby said transistor conducts even during the substantially simultaneous switching of both said transferor and transferee cores in response to said shift means, and whereby, upon the substantially coincident termination of switching of said transferor and transferee cores and the consequent removal of the forward bias from the input-circuit electrodes of said transistor, transistor current continues nevertheless to flow for a short time through said transferee-core one input winding due to carrier storage in said transistor, said continued transistor current flow through said one input winding being sufficient to induce a voltage in said transferee-core another input winding of a polarity to bias said transistor for conduction, the action being regenerative and continuing until said transferee core has completely switched to its other state.

7. A one core per bit shift register comprising: a transferor core and a transferee core, each of said cores being capable of assuming either of two stable states of magnetic remanence, each of said cores having windings coupled thereto; shift pulse means for switching substantially simultaneously both of said cores, a voltage being induced in each winding coupled to each of said cores in response to the switching of such core; a transistor having input-circuit electrodes and output-circuit electrodes, one of which electrodes may be common to both said input and output circuits; means including a first asymmetrically conducting device for applying across said input-circuit electrodes of said transistor a substantial portion of the voltage induced in the output winding of said transferor core when said transferor core switches in response to said shift pulse, thereby to bias said transistor into conduction; means connecting an input winding of said transferee core in the output circuit of said transistor, whereby current flows through said input winding when said transistor conducts; impedance means connecting another winding of said transferee core in the input circuit of said transistor for applying to the input-circuit electrodes of said transistor but a small portion of the voltage induced in said another winding when said transferee core switches in response to said shift pulse, thereby to maintain said transistor biased for conduction in response to said shift switching of said transferor core despite the simultaneous shift switching of said transferee core, said input and said another windings of said transferee core being wound in such sense relative to each other that transistor current flow in said input winding tends to induce a voltage in said another winding of a polarity to maintain said transistor biased for conduction, whereby, upon the substantially coincident termination of said simultaneous shift switching of said transferor and transferee cores and the consequent removal of the bias from the input electrodes of said transistor, transistor current nevertheless tends to flow for a short time through said transferee-core input winding due to minority carrier storage in said transistor, said last-mentioned transistor current flow through said input winding being sufficient to induce a voltage in said transferee-core another input winding of a polarity to maintain said transistor biased for conduction, the action being regenerative and continuing until said transferee core has completely switched to its other state.

8. Apparatus as claimed in claim 7 characterized in that said impedance means comprises a second asymmetrical conductive device poled to impose a relatively high impedance to current induced in said another winding when said transferee core switches in response to said shift pulse but to impose a relatively low impedance to current induced in said another winding when said transferee core switches to its said other state.

9. Apparatus as claimed in claim 7 characterized in that said impedance means comprises a resistance.

References Cited in the file of this patent

UNITED STATES PATENTS

| | | |
|---|---|---|
| 2,644,893 | Gehman | July 7, 1953 |
| 2,652,501 | Wilson | Sept. 15, 1953 |
| 2,747,110 | Jones | May 22, 1956 |

OTHER REFERENCES

"A Transistor-Magnetic Core Circuit" by S. S. Guterman and W. M. Carey, Jr., pages 84 to 94 of the IRE 1955 Convention Record, Part 4.